(12) United States Patent
Bessette et al.

(10) Patent No.: US 11,732,904 B2
(45) Date of Patent: Aug. 22, 2023

(54) WATER REGULATION SYSTEM AND METHOD OF USE THEREOF

(71) Applicant: NOFLO INC., St-Jean-sur-Richelieu (CA)

(72) Inventors: Jean-François Bessette, St-Jean-sur-Richelieu (CA); Luc Fortin, Saint-Jean-sur-Richelieu (CA)

(*) Notice: Subject to any disclaimer, the term of this patent is extended or adjusted under 35 U.S.C. 154(b) by 497 days.

(21) Appl. No.: 16/926,242

(22) Filed: Jul. 10, 2020

(65) Prior Publication Data
US 2021/0010683 A1 Jan. 14, 2021

Related U.S. Application Data

(60) Provisional application No. 62/873,547, filed on Jul. 12, 2019.

(51) Int. Cl.
F24D 19/10 (2006.01)
H04W 4/80 (2018.01)
G05D 7/06 (2006.01)
E03B 7/07 (2006.01)

(52) U.S. Cl.
CPC .......... F24D 19/1051 (2013.01); E03B 7/075 (2013.01); G05D 7/0635 (2013.01); H04W 4/80 (2018.02)

(58) Field of Classification Search
CPC ... F24D 19/1051; E03B 7/075; G05D 7/0635; H04L 67/12
USPC .................................................. 700/275–285
See application file for complete search history.

(56) References Cited

U.S. PATENT DOCUMENTS

| 5,277,219 A | 1/1994 | Lund |
| 5,829,467 A | 11/1998 | Spicher |
| 6,147,613 A | 11/2000 | Doumit |
| 6,147,614 A | 11/2000 | Parish |
| 6,337,635 B1 | 1/2002 | Ericksen et al. |
| 6,532,979 B1 | 3/2003 | Richter |
| 6,892,746 B2 | 5/2005 | Ford |
| 7,304,569 B2 | 12/2007 | Marcichow |
| 7,421,784 B2 | 9/2008 | Akkala et al. |

(Continued)

FOREIGN PATENT DOCUMENTS

| DE | 202016007549 U1 | 5/2017 |
| EP | 2949245 A1 | 12/2015 |

(Continued)

OTHER PUBLICATIONS

Walski, Thomas M., et al. "Advanced water distribution modeling and management." (2003).pp. 1-60 (Year: 2003).*

(Continued)

Primary Examiner — Satish Rampuria

(57) ABSTRACT

A peripheral unit for use in a water regulation system that controls the intake of water in a water circulation system of a building; it has a power source; a user input interface; a motion detector; a communication interface that is configured to establish a connection with the control panel; and a controller that is configured to send a first transmission to the control panel via the connection for causing the controller of the control panel to actuate opening of the water valve for a given period of time; and send a second transmission to the control panel via the connection for causing the controller of the control panel to actuate closing of the water valve.

16 Claims, 12 Drawing Sheets

(56) References Cited

U.S. PATENT DOCUMENTS

| | | | |
|---|---|---|---|
| 8,028,355 | B2 | 10/2011 | Reeder et al. |
| 8,667,978 | B2 | 3/2014 | Ford |
| 9,044,770 | B1 | 6/2015 | Eyring et al. |
| 9,297,150 | B2 | 3/2016 | Klicpera |
| 9,601,947 | B2 | 3/2017 | Ogden |
| 9,809,961 | B2 | 11/2017 | Guidish |
| 2002/0095721 | A1 | 7/2002 | Quintana |
| 2004/0128034 | A1* | 7/2004 | Lenker ................ G05D 7/0635 700/282 |
| 2005/0174245 | A1 | 8/2005 | Delaney et al. |
| 2005/0199842 | A1 | 9/2005 | Parson et al. |
| 2010/0052920 | A1 | 3/2010 | Roach |
| 2010/0307600 | A1 | 12/2010 | Crucs |
| 2010/0307733 | A1* | 12/2010 | Karamanos ............. F24F 12/00 165/254 |
| 2012/0192965 | A1 | 8/2012 | Popper et al. |
| 2012/0291886 | A1* | 11/2012 | Rivera .................... E03B 7/071 137/487.5 |
| 2013/0248023 | A1 | 9/2013 | Estrada, Jr. |
| 2014/0224350 | A1 | 8/2014 | Patel |
| 2016/0024759 | A1* | 1/2016 | Vinjamaram ............. E03B 7/10 137/12 |
| 2016/0258144 | A1* | 9/2016 | Tayenaka ............... G05D 27/02 |
| 2016/0281348 | A9* | 9/2016 | Karamanos ............... F24F 7/04 |
| 2018/0283705 | A1* | 10/2018 | Handsaker ............... F24F 3/056 |
| 2019/0024350 | A1* | 1/2019 | Silverstein .............. G01S 13/88 |
| 2019/0025150 | A1 | 1/2019 | Picardi et al. |

FOREIGN PATENT DOCUMENTS

| | | |
|---|---|---|
| GB | 2452337 A | 3/2009 |
| WO | 2008/020407 A2 | 2/2008 |
| WO | 2015/123336 A1 | 8/2015 |

OTHER PUBLICATIONS

Abd Aziz, Shamsul Anuar. Development of Water Pressure and Distribution Monitoring System Using PLC and SCADA. Diss. Universiti Tun Hussein Onn Malaysia, 2013.pp. 1-37 (Year: 2013).*

Utkarsh, Kumar, et al. "A Network-Aware Distributed Energy Resource Aggregation Framework for Flexible, Cost-Optimal, and Resilient Operation." IEEE Transactions on Smart Grid 13.2 (2021): pp. 1213-1224. (Year: 2021).*

Yussof, Nurfarah Anisah Mohd, and Hann Woei Ho. "Review of Water Leak Detection Methods in Smart Building Applications." Buildings 12.10 (2022): pp. 1-27. (Year: 2022).*

Arens, Edward, et al. How ambient intelligence will improve habitability and energy efficiency in buildings. Springer Berlin Heidelberg, 2005.pp. 1-16 (Year: 2005).*

Mullassery, Dawn John. "Sensors and analytics for smart buildings." University of British Columbia: Vancouver, BC, Canada (2015). pp. 1-23 (Year: 2015).*

* cited by examiner

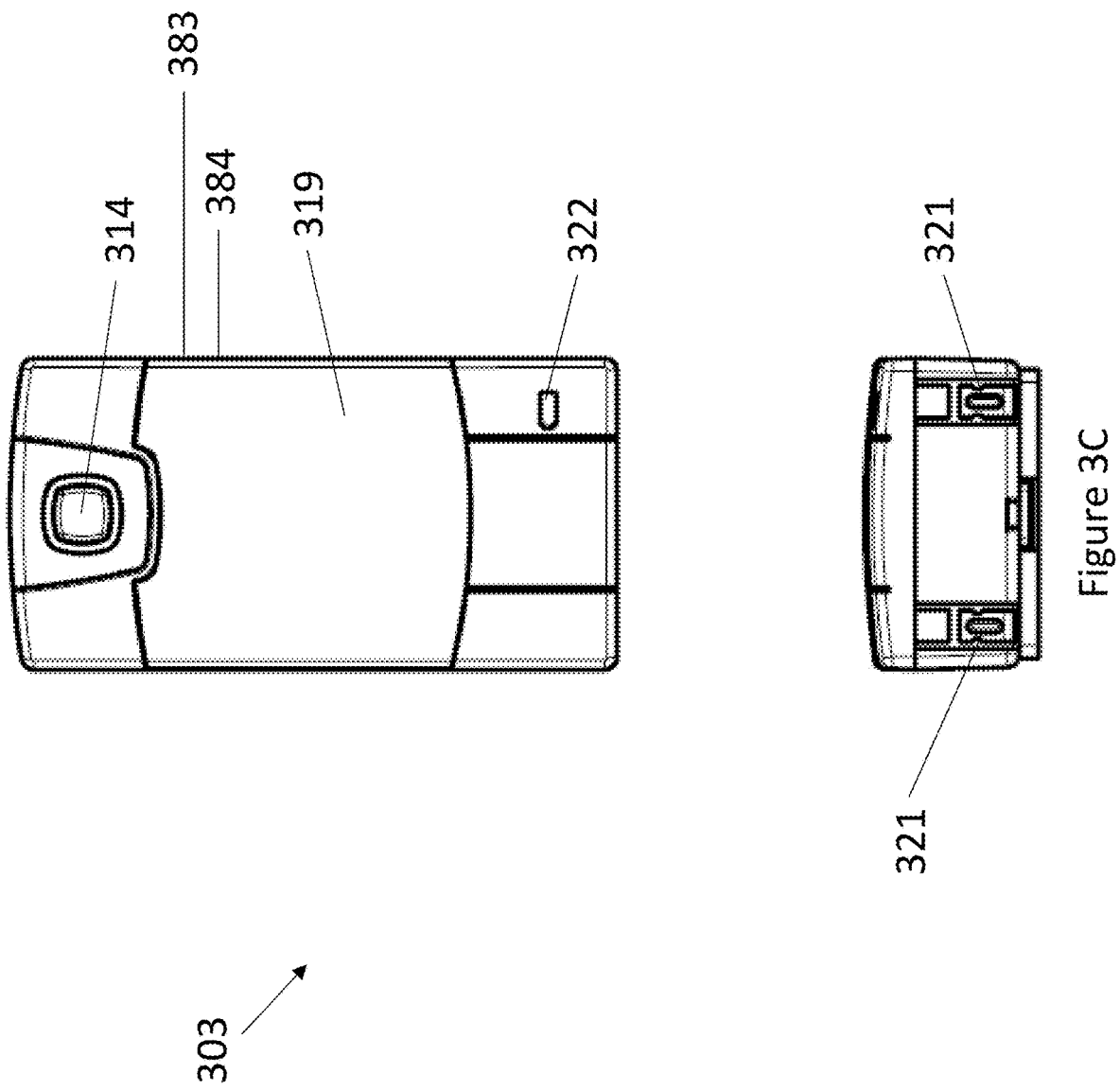

WATER REGULATION SYSTEM AND METHOD OF USE THEREOF

The present application claims priority from U.S. provisional patent application No. 62/873,547 filed on Jul. 12, 2019, incorporated herein by reference.

TECHNICAL FIELD

The present disclosure relates to water distribution in buildings, and more particularly water regulation systems for controlling water distribution in buildings.

BACKGROUND

Water circulation systems are used to carry water into buildings and to circulate water throughout buildings. For example, a water circulation system may carry water into a house, and then circulate the water to rooms such as a kitchen, a bathroom, or a utility room. Water circulation systems generally provide a flow of water into a building at all times unless the water is manually shut off. Shutting off the flow of water may require manually closing a main valve of the water circulation system. Likewise, restarting the flow of water may require manually opening the main valve.

Certain systems exist for regulating the flow of water in a building. These systems may include an additional valve or may be connected to a valve of the building, allow for the flow of water when occupants are detected on the premises of the building. For instance, the system may include a motion sensor that detects the presence of an occupant and opens the valve for a given period. However, these systems usually have only a single input interface allowing the user to cause the actuation of the valve, and do not provide for a mechanism to quickly allow an occupant to shut off the flow of water upon detection of a leak, or when water is not needed for a given period.

SUMMARY

The present disclosure relates to a water regulation system to be used with the water circulation system of the building. The water regulation system includes a plurality of peripheral units that communicate with a main control panel. At least a portion of the peripheral units includes an input interface acting as an override button, that allows the user to shut off the valve from any room in which a peripheral unit has been installed. As such, the user can rapidly use the water regulation system from his current location to shut off the flow of water, therefore avoiding the outpour of water as a result of a leak. The peripheral units communicate with the main control panel, where the main control panel communicates with the valve to cause the opening or closing of the valve.

In some embodiments, the water regulation system may not cause the opening of the valve until user input is received either at the control panel or at one of the peripheral units corresponding to input of the user to open the valve. Such input may include, but is not limited to, entering a passcode, pressing a button, providing a fingerprint identification, etc.

A first broad aspect is a water regulation system for regulating the water of a water circulation system of a building or of a portion of a building. The system includes a water valve with an open and closed position for regulating the flow of water into the water circulation system of the building or of the portion of the building; a control panel comprising, a power source for providing power to the control panel; a user input interface; a communication interface; a controller that is configured to actuate the opening or closing of the water valve; and one or more peripheral units, wherein each peripheral unit of the one or more peripheral units including a power source for providing power to the peripheral unit; a user input interface; a motion detector; a communication interface that is configured to establish a connection with the communication interface of the control panel; and a controller that is configured to upon the motion detector detecting motion, send a first transmission to the control panel via the connection for causing the controller of the control panel to actuate opening of the water valve for a given period of time; and upon the input interface receiving input from a user to close the water valve, send a second transmission to the control panel via the connection for causing the controller of the control panel to actuate closing of the water valve.

In some embodiments, the water valve may not reopen following the control panel actuating the closing of the water valve after receiving the second transmission until additional user input is received at the control panel or the input interface of one of the one or more peripheral units to reopen the water valve.

In some embodiments, the communication interface of the control panel may be further configured to establish a further wireless connection with an external computing device, and wherein the additional user input that is received at the control panel may include input that is transmitted via the further wireless connection established between the communication interface of the control panel and the external computing device.

In some embodiments, the external computing device may be one of a smartphone, a tablet computer and a laptop computer.

In some embodiments, the additional user input that is received at the control panel may be a passcode that is entered at the input interface of the control panel.

In some embodiments, the system may include one or more humidity-sensing peripheral units, wherein each of the one or more humidity-sensing peripheral units including a humidity sensor configured to detect the presence of water; an interface for establishing an additional connection with the communication interface of the control panel; and a controller that is configured to transmit a third transmission to the control panel via the additional connection for causing the controller of the control panel to actuate closing of the water valve upon the humidity sensor detecting presence of the water.

In some embodiments, at least one of the one or more humidity-sensing peripheral units may include a fastener for attaching the humidity-sensing peripheral unit to a wall of a bath or a sink such that the humidity sensor detects if water in the bath or the sink reaches a designated level.

In some embodiments, the connection may be a wireless Bluetooth connection.

In some embodiments, the connection may be a radio frequency connection.

In some embodiments, the water valve may control the water circulation system of the building.

In some embodiments, the control panel further may include a series a visual indicators, wherein each visual indicator of the series of visual indicators may correspond to one of the one or more peripheral units, and wherein the series of visual indicators indicates if motion is detected by the one more peripheral units following reception of the first transmission by the communication interface of the control panel.

In some embodiments, the control panel may cause the actuation of the water valve by transmitting a wireless transmission to an actuator of the water valve that causes the opening or closing of the water valve.

In some embodiments, the control panel may cause the actuation of the water valve via a wired connection to an actuator of the water valve that causes the opening or closing of the water valve.

Another broad aspect is a peripheral unit for use in a water regulation system that controls the intake of water in a water circulation system of a building or of a portion of the building, the water regulation system comprising a main control panel that actuates the opening or closing of a water valve for regulating the flow of water into the water circulation system of the building or the portion of the building. The peripheral unit includes a power source for providing power to the peripheral unit; a user input interface; a motion detector; a communication interface that is configured to establish a connection with a communication interface of the control panel; and a controller that is configured to, upon the motion detector detecting motion, send a first transmission to the control panel via the connection for causing the controller of the control panel to actuate opening of the water valve for a given period of time; and upon the input interface receiving input from a user to close the water valve, send a second transmission to the control panel via the connection for causing the controller of the control panel to actuate closing of the water valve.

In some embodiments, the user input interface may be a button.

In some embodiments, the controller may be further configured to receive a third transmission via the connection from the control panel to shut off the peripheral unit.

In some embodiments, the controller may be further configured to, when the water valve is closed, transmit a fourth transmission via the connection to the control panel to cause the water valve to reopen after receiving corresponding user input to reopen the water valve on the user input interface.

In some embodiments, the peripheral unit may include an indicator for signaling to a user that the water valve is open or closed.

In some embodiments, the indicator may be a visual indicator that illuminates the input interface, and may display a first colour when the valve is open and displays a second colour when the valve is closed.

In some embodiments, the power source may be a battery, and the peripheral unit may include an indicator for indicating a power depletion status of the battery.

Another broad aspect is a method of regulating water in a water circulation system of a building or of a portion of the building to rapidly shut off flow into the building or the portion of the building. The method includes detecting activity of a user in a room of a building; transmitting a first transmission to a control panel for causing the opening of a water valve, allowing water to flow into the water circulation system of the building or of the portion of the building for a given period; receiving user input associated with stopping the flow of water into the water circulation system of the building or of the portion of the building; and transmitting a second transmission to the control panel for causing the closing of the water valve, stopping the flow of water into the water circulation system of the building or of the portion of the building.

In some embodiments, the method may include, after transmitting the second transmission, receiving user input associating with allowing the flow of water to return into the circulation system of the building or of the portion of the building; detecting further activity of a user in a room or a building; and transmitting a third transmission to a control panel for causing the reopening of the water valve, allowing water to flow into the water circulation system of the building or of the portion of the building for a given period.

In some embodiments, the method may include after the second transmission, after a user provides user input at the control panel for allowing the water valve to reopen upon detecting motion in a room of the building or of the portion of the building, detecting motion of a user in a room of the building or of the portion of the building respectively; and transmitting a third transmission to a control panel for causing the reopening of the water valve, allowing water to flow into the water circulation system of the building or of the portion of the building for a given period.

In some embodiments, the user input associated with stopping the flow of water may be received by the user pressing an override button.

In some embodiments, the detecting of activity may be detecting motion in the room or the building.

In some embodiments, the detecting of activity may be detecting turning on a light switch in the room or the building.

BRIEF DESCRIPTION OF THE DRAWINGS

The invention will be better understood by way of the following detailed description of embodiments of the invention with reference to the appended drawings, in which:

FIG. 3C is a drawing of a side perspective view of an exemplary peripheral unit with a humidity sensor of an exemplary water regulation system;

DETAILED DESCRIPTION

In general, the present disclosure relates to water regulation systems and methods. These systems and methods may regulate the flow of water into a building and the circulation of water throughout the building. They may enable and/or disable the flow of water into portions of the building in response to inputs including manual commands and/or sensor readings.

In general, a water regulation system may enable or shut off a flow of water into a water circulation system of a building or of a portion of a building based on a variety of data. Data may include motion sensor activation, moisture probe readings, and manual override input. For example, water flow into a building may be enabled in response to a motion sensor, in the building being activated. For another example, water flow into a building may be shut off when a manual override command is given in the building. The following description will detail exemplary methods and the hardware and software which may be used to implement them.

As used herein, a building may be any type of building known in the art. For example, a building may be a single-family home, an apartment building, another type of residential building, a warehouse, a factory, an office building, or another type of industrial building. One skilled in the art will be able to implement the systems and methods disclosed herein in any type of building. Accordingly, systems and methods used in any type of building are within the scope of the present disclosure.

A building may have a water circulation system, which is configured to allow water to circulate throughout the building. A water circulation system may include one or more pipes configured to carry water into the building and one or more pipes configured to carry water throughout the building. A water circulation system may optionally additionally include elements to regulate the temperature and pressure of the water. One skilled in the art will be able to implement the systems and methods disclosed herein with any type of water circulation system. Accordingly, systems and methods used with any type of water circulation system are within the scope of the present disclosure.

In a first aspect, the present disclosure relates to water regulation systems. FIGS. 1-5 illustrate water regulation systems and components thereof. The following description will refer to FIGS. 1-5. One skilled in the art will recognize that a water regulation system may include a combination of elements illustrated in different Figures and may include elements not illustrated in any Figure without departing from the scope of the present disclosure.

Figure 1A:
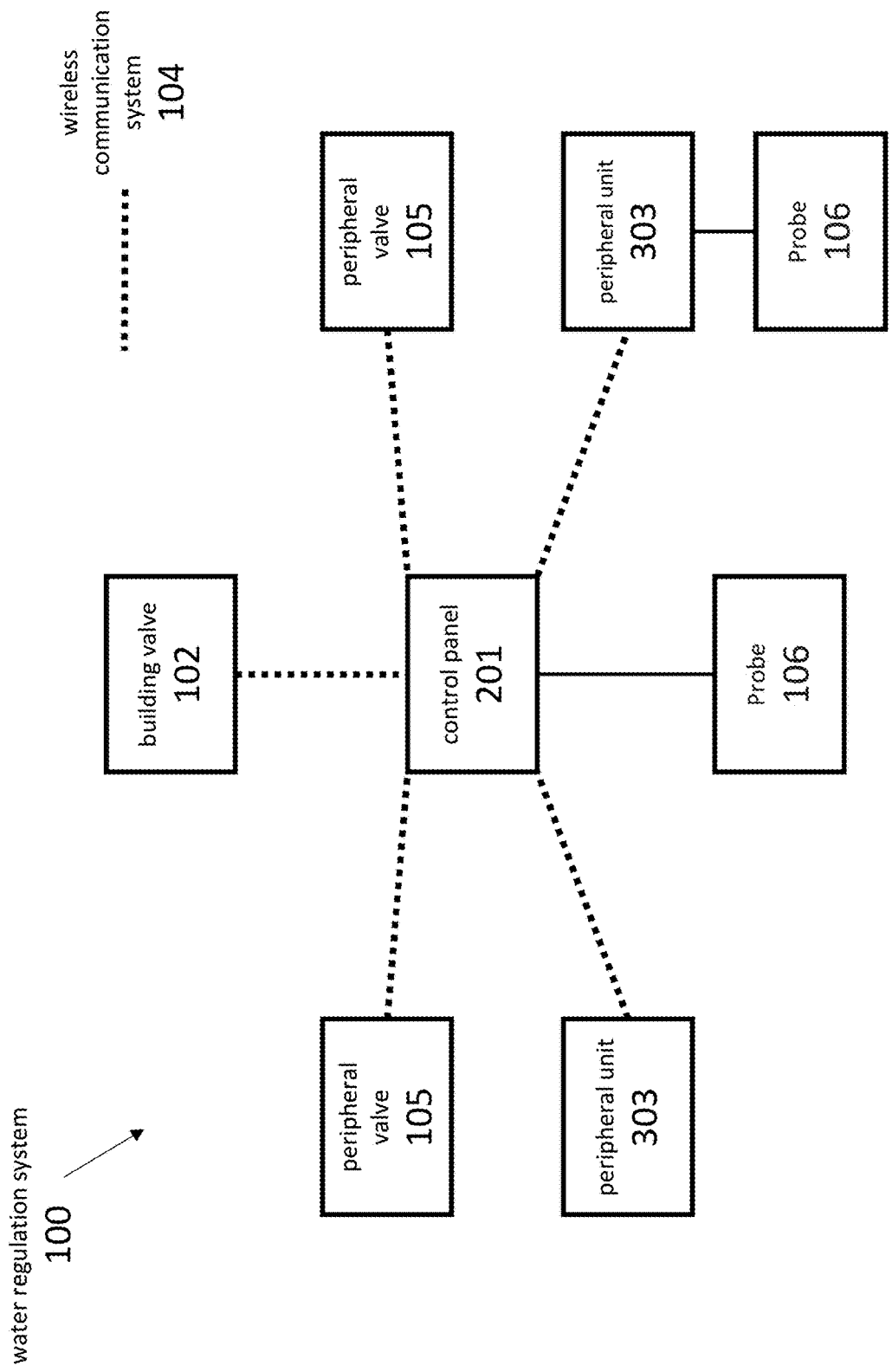
FIG. 1A is a block diagram of an exemplary water regulation system.
Figure 1B:
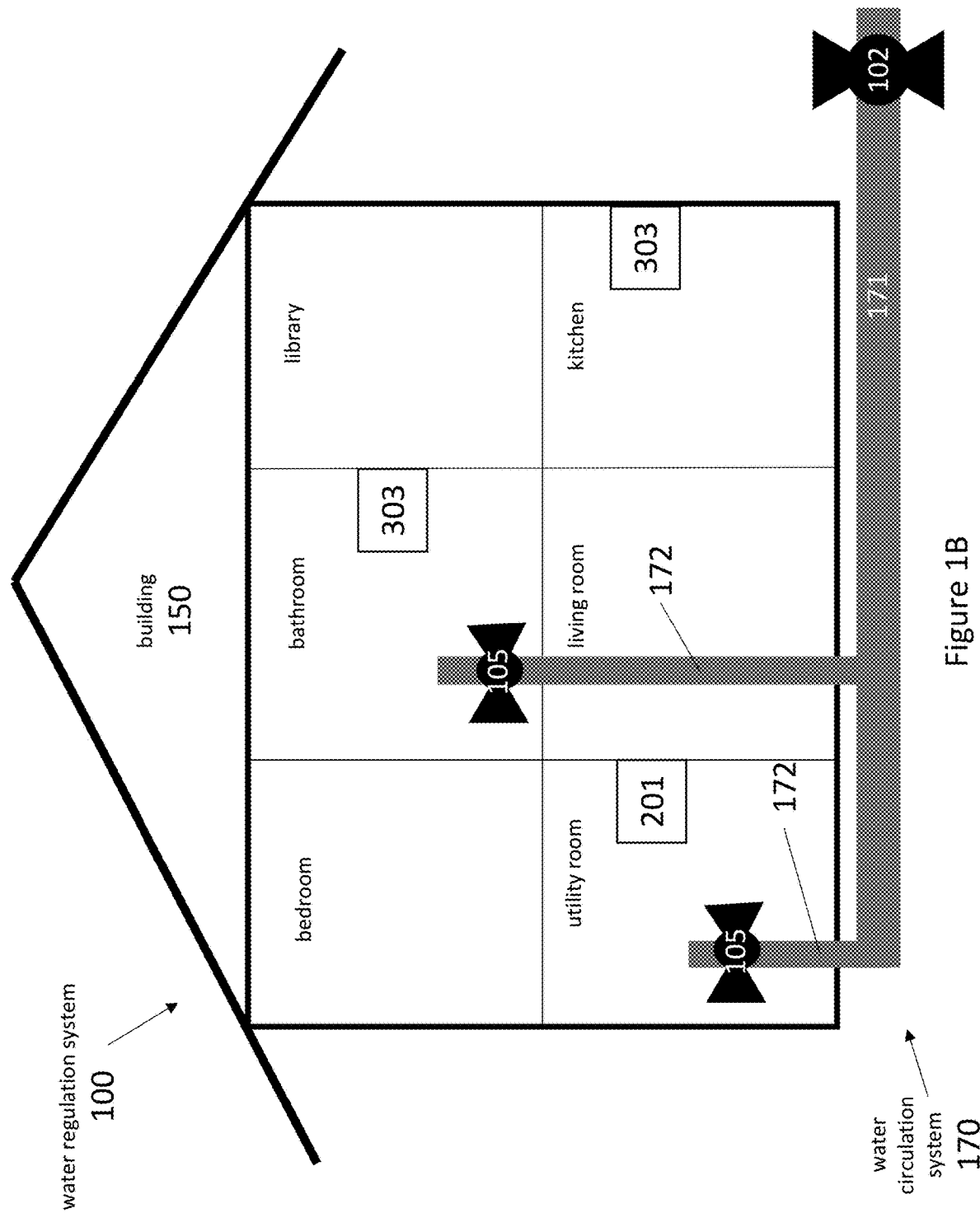
FIG. 1B is a block diagram of an exemplary building with an exemplary water circulation system with an exemplary water regulation system that includes valves and/or controls valves of the building.

FIGS. 1A-1B illustrate a water regulation system 100. The water regulation system 100 may be configured to regulate the flow of water into the water circulation system of a building and the circulation of water throughout the building.

The water regulation system 100 includes a control panel 201, one or more water valves 102 for controlling the water entering the circulation system of the building or of a portion of the building, one or more peripheral units 303 and, optionally, one or more probes 106. In some embodiments, the water regulation system 100 may include a wireless communication system 104. In some embodiments, the water regulation system 100 may also include one or more peripheral valves 105 and one or more probes 106. FIG. 1B illustrates a water regulation system 100 implemented in a building 150 with a water circulation system 170.

The functions of the components of the water regulation system 100 will be outlined here and described in more detail below. The peripheral units 303 may collect a variety of data, which may include motion sensor activations, manual override signals, and moisture sensor readings. The data may be communicated to the control panel 201 via the wireless communication system 104 or a wired connection. The control panel 201 may determine whether water flow into the building 150 should be allowed or shut off based on the programmable inputs or factory pre-settings. The water valve 102 may open and close to allow/shut off a flow of water into the building 150. The control panel 201 may communicate a signal to the building valve 102 via the wireless communication system 104, or via a wired connection, to open or close the building valve 102 based on the data received from one of the peripheral units 303.

An actuator 282 may be present to open or close the valve 102, e.g., pneumatically, electrically, driven by motor, etc. The actuator 282 may receive wireless transmission or wired transmissions from the control panel 201.

Figure 2A:
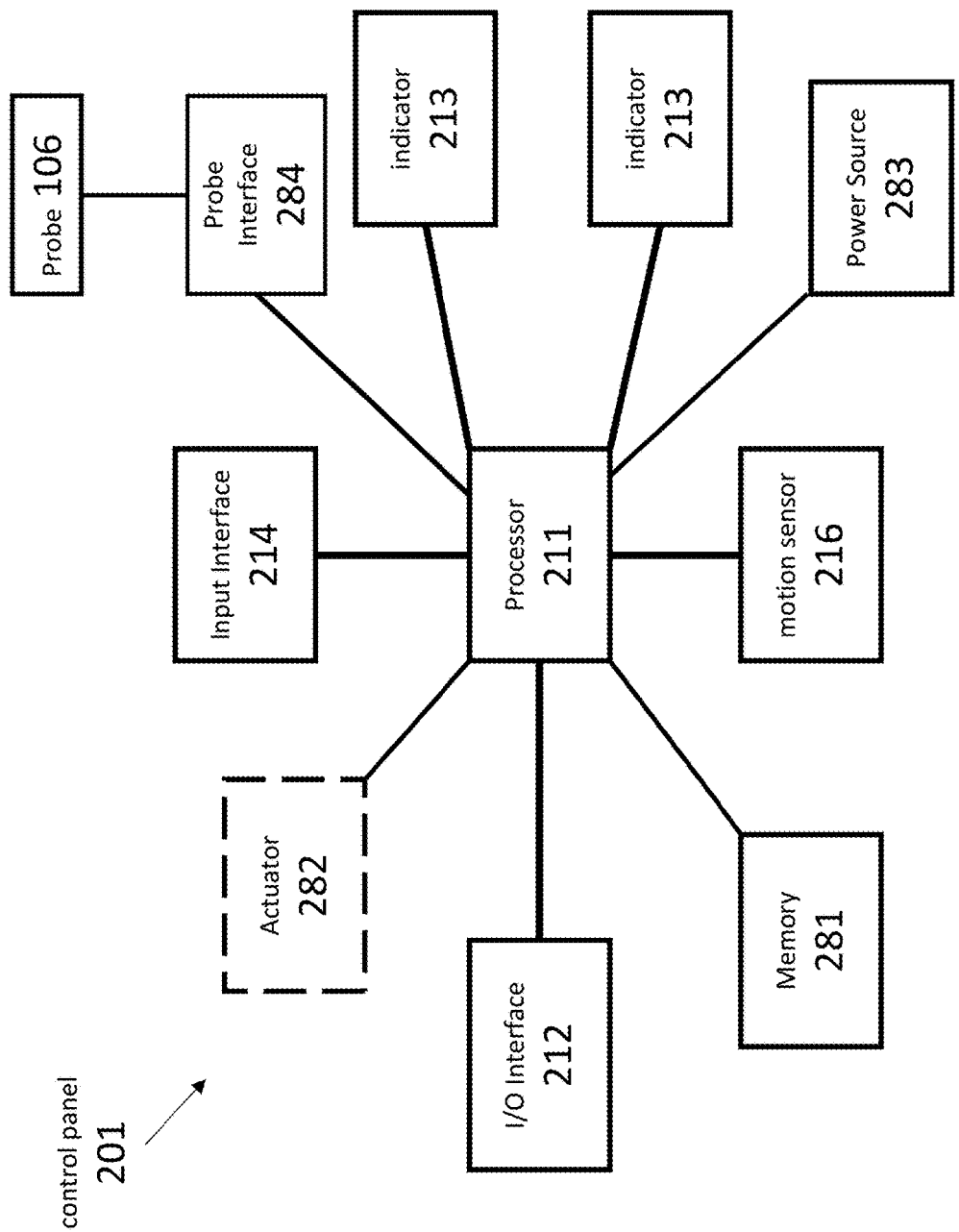
FIG. 2A is a block diagram of an exemplary control panel of an exemplary water regulation system.
Figure 2C:
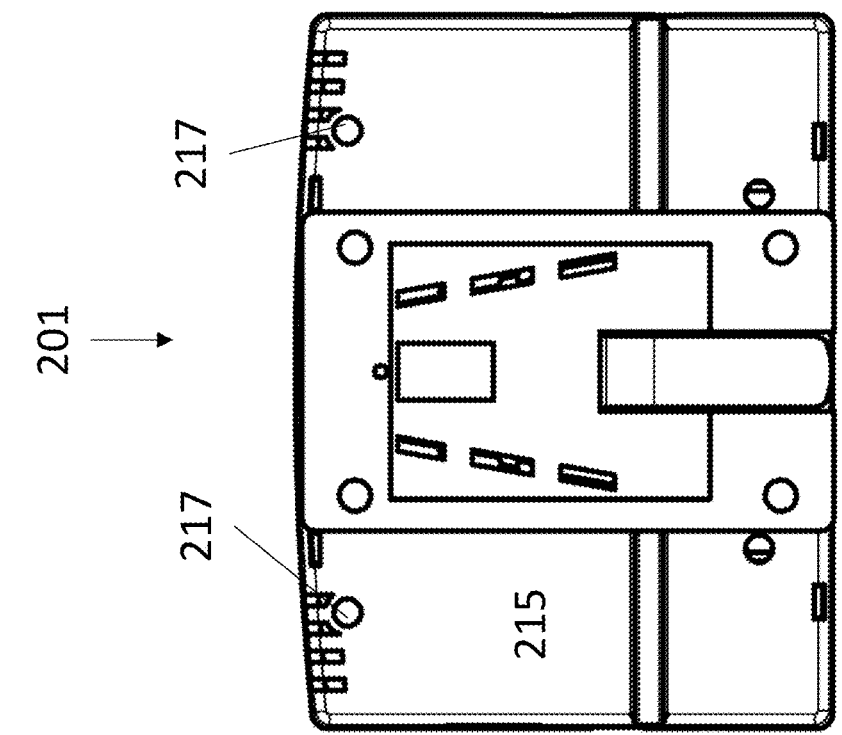
FIG. 2C is a drawing of a back view of an exemplary control panel of an exemplary water regulation system.
Figure 2B:
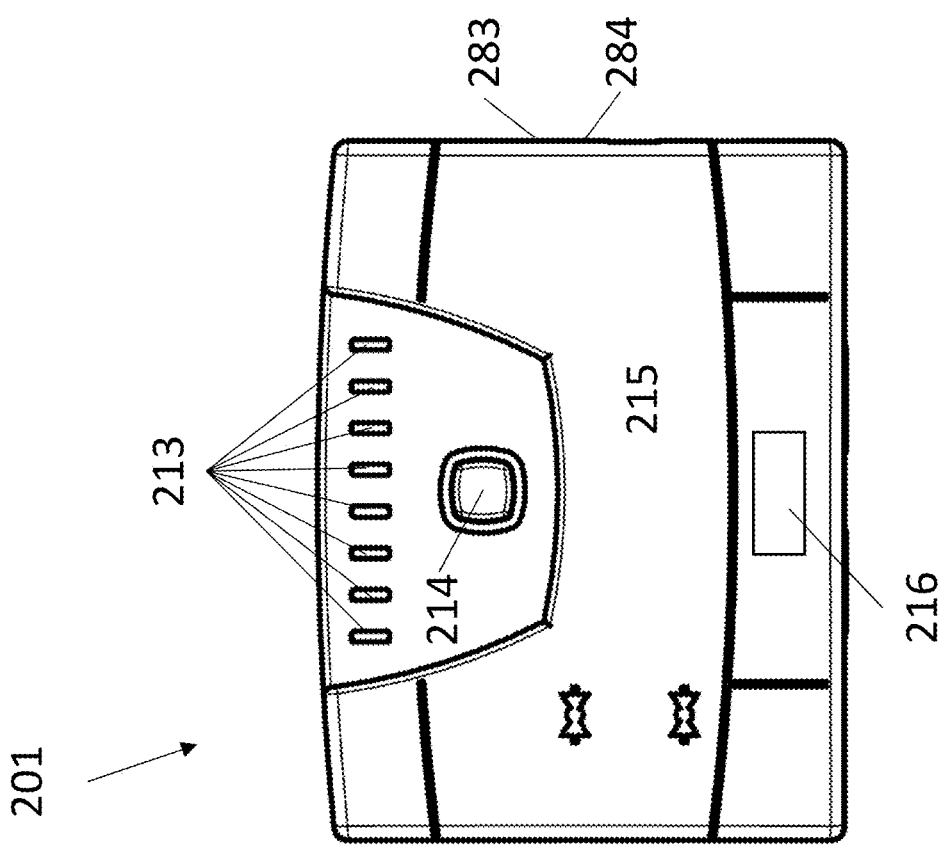
FIG. 2B is a drawing of a front view of an exemplary control panel of an exemplary water regulation system.

Exemplary Control Panel:

FIGS. 2A-2C illustrate an exemplary control panel 201 in detail, showing a schematic diagram, a front view, and a back view, respectively. The control panel 201 includes a main controller, an input/output interface 212, an input interface 214, a housing 215 and a power source 283.

In some embodiments, the control panel 201 may include one or more light and/or sound indicators 213.

The housing 215 may contain the other elements of the control panel 201. The housing 215 may also be configured such that it may be mounted on a wall. The housing 215 may be accessed by a human operator, such that the human operator may provide input through the input interface 214 and may easily see/read the indicators 213. For example, the housing 215 may include mounting holes 217 which allow it to be attached to a wall or to a support 320 (such as a support bracket). In some embodiments, the housing 215 may include a stand (not illustrated) or other elements which allow it to be disposed on a shelf or other surface. FIG. 2B shows an exemplary form factor for a housing 215. However, the housing 215 may have any form factor without departing from the present teachings, provided that the housing contains the components of the control panel 201. In some embodiments, the housing 215 may be made of a durable, lightweight material, such as plastic.

As shown in FIG. 1B, the control panel 201 may be mounted in an easily accessible location in the building 150. For example, if the building 150 is a single-family home, the control panel 201 may be located in a utility room. The control panel 201 may be located at such a position that a human operator can easily view the indicators 213 and provide user input, for example, through the input interface 214. For example, the control panel 201 may be mounted on a wall at a height of about five feet.

The input/output interface 212 may be, e.g., a wireless/wired receiver and a transmitter, or a wireless/wired transceiver for establishing a wireless connection with the peripheral units 303 of the system 100. When the I/O interface 212 establishes a wireless connection with the one or more peripheral units 303, the wireless connection may be a Bluetooth connection, or any other radio frequency protocol.

The I/O interface 212 may also establish a wireless connection with an external computing device such as a smartphone, smartwatch, tablet, desktop computer, laptop computer, remote cloud etc., for receiving input and sending output wirelessly from the external computing device to, for instance, cause the control panel 201 to actuate the opening or closing of the valve, or to allow the system 100 to receive input from the peripheral units 303 after, e.g., input to shut off the water valve 102 has been received at an input interface 312 of one of the peripheral units 303, or input received from one of the probes 106. Other input that may be communicated to and from the control panel 201 via the wireless connection with the computing device may include, but is not limited to, programmed settings of the system and/or the control panel 201, event history, etc.

In some examples, where the control panel 201 sends the commands to actuate the water valve 102, the I/O interface 212 may also communicate with the actuator of the water valve 102.

In other examples, the control panel 201 may have a wired connection with the actuator 282 of the water valve 102 to transmit via the wired connection the commands to actuate the water valve 102.

The controller of the control panel 201 may include a processor 211 and memory 281 as is known in the art. The processor 211 may be connected to the memory 281 via a BUS. The memory 281 stores instructions in the form of program code that, when executed by the processor 211, causes the control panel 201 to transmit commands to actuate the control valve 102.

For instance, the program code stored in memory 281 may be adapted to cause the control panel 201, when executed by the processor 211, to send out a command to actuate the opening of the water valve 102 when the I/O interface 212 of the control panel 201 receives a wireless transmission from a peripheral unit 303 after the peripheral unit 303 detects activity in a room, using, for instance, a motion detector. After the passing of a period of time calculated using, e.g., a timer of the control panel 201, the processor 211, upon execution of program code stored in memory 281, may send out instructions to actuate the closing of the water valve 102 until, e.g., further input is received from a peripheral unit 303 that user activity has been further detected in the building 150.

The program code stored in memory 281 may be adapted to cause the control panel 201 to, when executed by the processor 211, send out a command to actuate the closing of the water valve 102 when the I/O interface 212 of the control panel 201 receives a wireless transmission from a peripheral unit 303 after the peripheral unit 303 receives user input to close the water valve 102 (e.g. pressing of a manual override button). The control panel 201 may then not allow for reopening of the water valve 102 until input to this effect has been received at the control panel 201 or at one of the peripheral units 303.

The user input interface 214 may include a button or keypad that provides for a manual override function to cause the shutting of the water valve 102. When the user input received at the user input interface 214 corresponds to the shutting of the water valve 102, the main controller may process this instruction and produce a command to shut off the flow of water to the building 150. The command may be transmitted to the building valve 102.

In some embodiments, the user input interface 214 may include an indicator that indicates to the user if the valve is open or closed. For instance, the indicator may be a light that flashes and/or changes colour, e.g. goes from green to red, when the valve goes from an open position to a closed position. In other embodiments, the indicator may be a source of sound (e.g. a speaker) that projects a beeping noise once the valve is in a closed/open position. It will be understood that other indicators for indicating to a user if a valve is opened or closed may be provided without departing from the present teachings.

In some embodiments, the input interface 214 may receive input for providing two settings, when the input is received and processed by the controller of the control panel 201, generating the corresponding transmission to actuate the water valve 102. The first setting could be tied with shutting off the water for a given period, where the second setting could be tied with shutting off the water until further input is provided to turn on the valve. For instance, the first input may be a quick press of the button of the input interface 214, where the second input may be holding the button of the input interface 214 for a longer period.

In some embodiments, the controller of the control panel 201 may be adapted to not reopen the water valve 102 following a manual override to shut off the water until user input is further received at, e.g., the user input interface 214 (or 314 at the peripheral unit 303) to allow a flow of water into the building 150. For instance, when the input interface 214 includes a keypad, the entering of a passcode may cause the control panel 201 to reopen the water valve 102 if a transmission is received from a peripheral unit corresponding to the detection of activity in the building 150. In other embodiments, the user input received at the input interface 214 or 314 (indirectly) causes the transmission of a command to reopen the valve without there needing to be any further activity detected by one of the peripheral units 303. The input may be the pressing of a button, to cause the reopening of the valve.

The control panel 201 may optionally include a motion detector 216. The motion detector 216 may detect motion in front of the control panel 201 and transmit motion detection information directly to the main controller. The main controller may process this information and produce a command to enable the flow of water into the building 150. In some embodiments, it may be desired that the motion detector 216 detect persons entering or leaving a room/area in which the control panel 201 is located. For example, FIG. 1B shows a control panel 201 located in a utility room. The control panel 201 may be mounted near a door of the utility room to detect persons entering/leaving the utility room.

The control panel 201 includes a power source 283. For example, the power source 283 may be an outlet connection or a battery connection. It will be appreciated that other power sources 283 may be used without departing from the present teachings.

The building valve 102 is illustrated in FIGS. 1A-1B. The building valve 102 of the water regulation system 100 may allow or stop the flow of water into the building 150. The building valve 102 may be any type of valve known in the art, such as a gate valve or a ball valve. The building valve 102 may be configured to simply allow or disallow the flow of water into the building 150 or may also be configured to control a rate of flow of water into the building 150. As shown in FIG. 1B, the building valve 102 may be disposed within a main pipe 171 of the water circulation system 170.

In some embodiments, the control panel 201 may have a probe interface 284 (such as a port) for establishing a connection (e.g. a wired connection) with a probe 106, as further described herein.

As discussed above, the building valve 102 may be controlled by the main controller of the control panel 201. To this end, the building valve 102 may include a communication module (not illustrated). The communication module may be connected and may both receive and transmit data via a wireless or wired connection from the control panel 201. For example, the communication module may receive commands to open or close the building valve 102 and may transmit information about whether the building valve 102 is open or closed. The communication module may comprise a transmitter and a receiver or any type of hardware known in the art which is capable of receiving and transmitting data. The actuator may process data received by the communication module. The actuator 282 opens or closes water valve 102 as a function of the commands received from the control panel 201.

The control panel 201 may also include one or more visual indicators 213. The visual indicators 213 may be a series of lights (e.g. LEDs) or pairs of LEDs that light up or provide light of a particular wavelength upon said control panel 201 receiving a transmission from a peripheral unit 303 that activity has been detected by the peripheral unit 303. As such, each of the peripheral units 303 may be associate with one of the visual indicators 213 of the series of visual indicators 213.

For instance, when motion is detected by the peripheral unit 303 found in the bathroom, and a transmission is received from the peripheral unit 303 of the bathroom, with, e.g., an identifier code or data indicative of the source of the transmission, the controller of the control panel 201 may process the data and light up the visual indicator 213 corresponding to the peripheral unit 303 located in the bathroom (e.g., represented by light indicator 213 "2"). As such, when the system 100 is installed, the control panel 201 may be configured to associate each of the peripheral units 303 with a given number, such that a user can monitor whether occupants are present in different portions of the house 150 using the visual indicators 213.

In some embodiments, the control panel 201 may be integrated to the alarm system of a building or may be a keypad module for an alarm system. The control panel 201, also acting as an alarm system, may provide a message wirelessly to the computing device (e.g. smartphone) of the user when a leak has been detected, when the valve has been shut off due to a manual override, etc. As such, the control panel 201 may include the features of an alarm system as is known in the art, such as an established connection with an alarm monitoring service that warns the user when an event has been detected by the system. In the present example, such an event may include the detection of a leak, when a user has shut off the valve using a manual override button, etc.

Exemplary Peripheral Unit with Motion Sensor:

The control panel 201 is in communication with one or more peripheral units 303 located throughout the building. The peripheral units 303 may be provided with different components depending on their utility and the information they collect for the water regulation system 100, as shown in FIG. 3A.

Figure 3A:
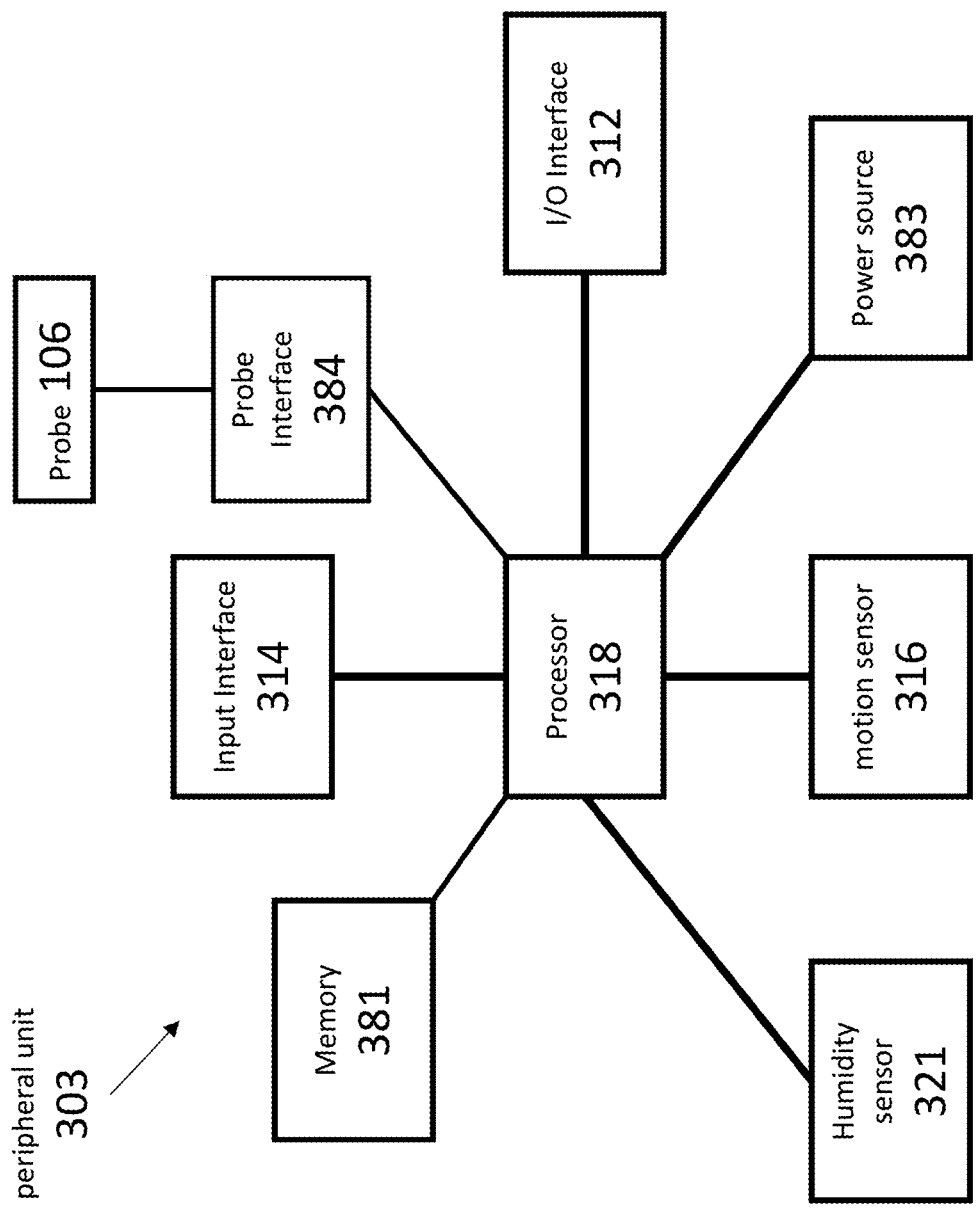
FIG. 3A is a block diagram of an exemplary peripheral unit with a motion sensor of an exemplary water regulation system.
Figure 3B:
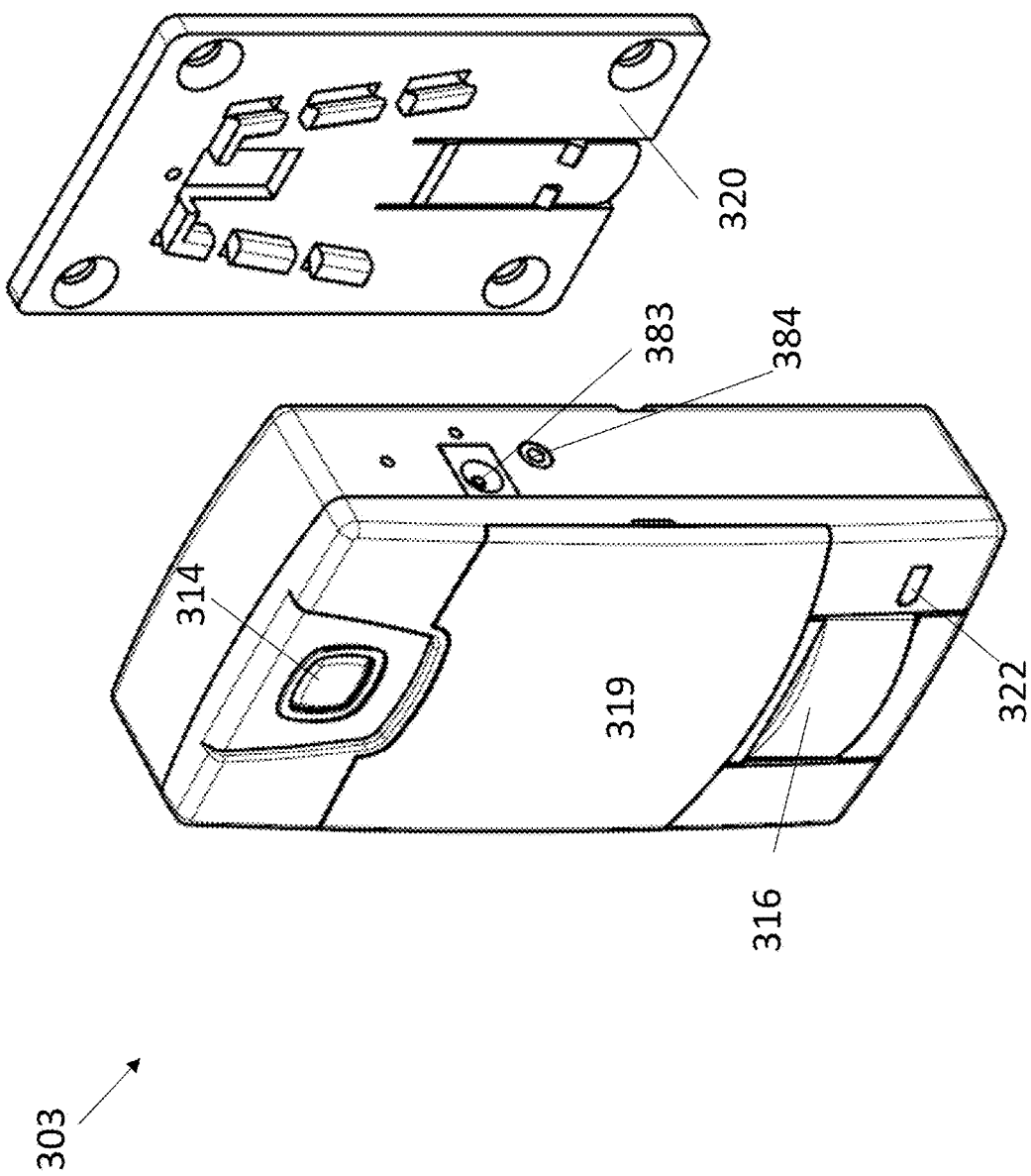
FIG. 3B is a drawing of a side perspective view of an exemplary peripheral unit with a motion sensor with an exemplary mounting.
Figure 3D:
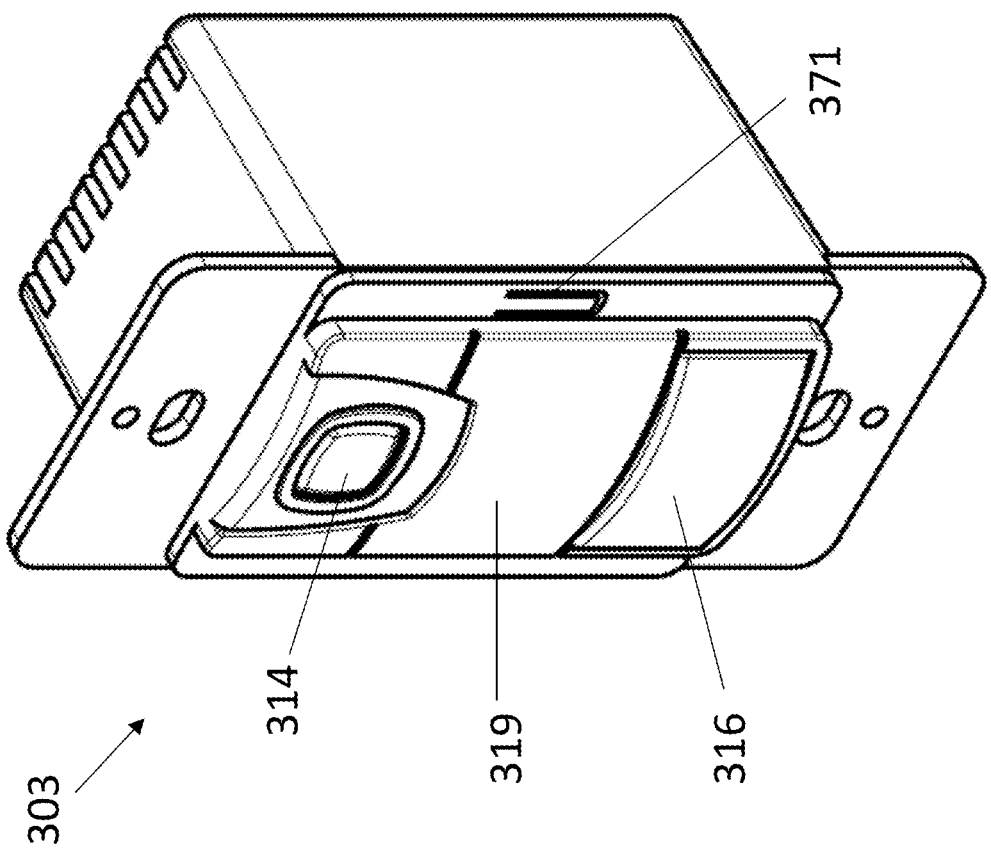
FIG. 3D is a drawing of a side perspective view of an exemplary peripheral unit with a motion sensor for integrating into a socket box.

FIGS. 3A, 3B and 3D illustrate exemplary peripheral units 303 with a motion sensor, showing a schematic diagram and an isometric view, respectively. A water regulation system 100 may include any number of peripheral units 303.

The peripheral unit 303 includes a controller, an input/output interface 312, a user input interface 314 and a housing 319. The peripheral unit 303 may include a probe interface 384 for connecting the peripheral unit 303 to a probe 106. The probe interface 384 may be a port (a female end) for receiving the male end of a connector.

When the probe 106 detects the presence of water, a signal can be sent via the connector between the peripheral unit 303 and the probe 106 to the peripheral unit 303. The peripheral unit 303, receiving the signal of the presence of water, may send a command to the control panel 201 for causing the control panel 201 to actuate the closing of the water valve.

As shown in FIG. 1B, peripheral units 303 may be located throughout the building 150, especially in areas/rooms with running water. For example, if the building 150 is a single-family home, peripheral units 303 may be mounted in the kitchen and the bathrooms.

The peripheral units 303 may be installed at eye level, such that a user may easily access the input interface 314 (e.g. button) located on each of the peripheral units 303, and also such that the activity sensor 316 of the peripheral unit 303 detects the presence of an occupant in the room.

The housing 319 may contain the other elements of the peripheral unit 303. The housing 319 may also be configured such that it may be mounted on a wall where it may be accessed by a human operator, such that the human operator may provide input through the manual override 314. For example, the housing 319 may attach to an optional mounting plate 320 which may allow it to be attached to a wall. For example, peripheral units 303 may be mounted on walls of the building 150 in easily accessible locations, at a height of about five feet. In some embodiments, the housing 319 may include a stand (not illustrated) or other elements which allow it to be disposed on a shelf or other surface. FIG. 3B shows an exemplary form factor for a housing 319. However, the housing 319 may have any form factor known in the art. In some embodiments, the housing 319 may be made of a durable, lightweight material, such as plastic.

The I/O interface 312 may both receive and transmit data. Specifically, the I/O interface 312 may receive data from and transmit data to the control panel 201. The I/O interface 312 may comprise a transmitter and a receiver or any type of hardware known in the art which is capable of receiving and transmitting data. The connection established between the I/O interface 312 and the I/O interface 212 may be wired or wireless.

The peripheral controller includes a processor 318 and memory 381. The processor 318 may be connected to the memory 381 via a BUS. The memory 381 stores instructions in the form of program code that, when executed by the processor 318, causes the processor 318 to perform certain tasks.

The peripheral unit 303 may process data received by the I/O interface 312 and produce data/commands to be transmitted by the I/O interface 312. Processing the data may comprise preparing the data to be sent to the control panel 201. For example, the peripheral unit 303 may package received data about a moisture level in a format readable by the processor 211 of the control panel 201. The data may be transmitted to the control panel 201 via the wireless communication system 104. ((The processor 211 may then determine whether the building valve 102 should remain open until a programmed auto shut off is activated or closed based on unacceptable moisture data.)) The peripheral unit 303 may include logic components that perform the processing described above and memory components that store code for operations logs of the peripheral unit and/or received or produced data. These components may be any type of logic and memory known in the art.

The motion detector 316 may detect motion in front of the peripheral unit 303 and transmit motion detection information directly to the processor 318. The processor 318 may process information and produce data to communicate to the control panel 201. The data may be transmitted to the control panel 201 via the wireless communication system 104 or hard wire. The motion detector 316 may be any type of motion detector known in the art, such as an ultrasonic sensor, an infrared sensor, a microwave sensor, or a tomographic sensor.

In some embodiments, it may be desired that the motion detector 316 detect persons entering or leaving a room/area in which the peripheral unit 303 is located. For example, FIG. 1B shows a peripheral unit 303 located in a bathroom. The peripheral unit 303 may be mounted near a door of the bathroom to detect persons entering/leaving the bathroom. In such embodiments, information about the detected motion may be transmitted to the control panel 201, which may in turn, produce a command to open a flow of water into the building 150.

In some embodiments, the main controller of the control panel 201 can determine a length of time since motion was last detected by any of the motion detectors 216, 316. If this length of time exceeds a programmed threshold time, the processor 211 may produce a command to shut off the flow of water into the building 150. The command may be transmitted to the building valve 102 via the I/O interface 212.

The user input interface 314 may allow a human operator to provide a command directly to the peripheral controller and may comprise a button or keypad. In some embodiments, the user input interface 314 may be a manual override e.g., button or switch. The manual override may allow a human operator to provide an instruction directly to the peripheral controller to communicate a command to the control panel 201 to shut off a flow of water into the building 150. The controller of the control panel 201 may process this instruction and produce a command to shut off the flow of water to the building 150. The command may be transmitted to the building valve 102. In some embodiments, the same manual override or an additional manual override/user input may also allow an operator to provide a command to allow a flow of water into the building 150.

In some embodiments, the user input interface 314 may include an indicator that indicates to the user if the valve is open or closed. For instance, the indicator may be a light that flashes and/or changes colour, e.g. goes from green to red, when the valve goes from an open position to a closed position. In other embodiments, the indicator may be a source of sound (e.g. a speaker) that projects a beeping noise once the valve is in a closed position. It will be understood that other indicators for indicating to a user if a valve is opened or closed may be provided without departing from the present teachings. The indicator of the user input interface 314 may also indicate the valve status (e.g. open/closed) when the motion detector 316 picks up the presence of a user (e.g. motion detection signal sent by the motion detector 316 the processor, the processor causing the indicator of the user input interface 314 to present an indication).

The manual override found on each of the peripheral units 303 may provide several important advantages for the water regulation system 100. The manual override may enable human operators to quickly shut off the flow of water into a building 150 by providing a simple input, for example by pressing a button. Further, the peripheral units 303 may be located in rooms/areas where running water is present, such as bathrooms and kitchens. Accordingly, the manual override 314 can be activated as soon as a leak or other problem occurs. This may enable the water regulation system 100 to respond rapidly to problems with the water circulation system 170, thereby increasing the safety of the building 150.

In some embodiments, the input interface 314 may receive input for providing two settings, when the input is received and processed by the controller of the peripheral unit 303, generating the corresponding transmission to the control panel 201 as a result. The first setting could be tied with shutting off the water for a given period, where the second setting could be tied with shutting off the water until further input is provided to turn on the valve. For instance, the first input may be a quick or short press of the button of the input interface 314, where the second input may be holding the button of the input interface 314 for a given period.

The peripheral units 303 may be powered through any means known in the art. For example, the peripheral unit 303 may include a power source 383. The power source 383 may be, for instance, a battery or a connection to a power outlet through, e.g. an AC/DC converter. The power source 383 may also be connected to the control panel 201, the peripheral unit 303 receiving power from the control panel 201 (powered via power source 283).

A peripheral unit 303 may include an indicator 322 which shows the battery charge level.

In some examples, as shown in FIG. 3D, the housing 319 of the peripheral unit 303 may be shaped such that it may fit in a socket box or a light switch box. In some examples, the peripheral unit 303, via the controller, may also control the opening or closing of lights in a room, via an input interface (e.g. a button, toggle switch, etc. not illustrated), or via the motion sensor 316, where the lights turn on for a given time upon the detection of motion in a room.

Exemplary Peripheral Unit with Humidity Sensor:

Reference is now made to FIG. 3C, illustrating an exemplary peripheral unit 303 with a humidity sensor 321. The peripheral unit 303, also referring to FIG. 3A, can be, for instance, placed under a water-consuming appliance (e.g. a washing machine, fridge, dish washer) or close to a source of water (e.g. a sink), where the humidity sensor 321 detects the presence of moisture (e.g. water). The controller, upon receiving a signal from the humidity sensor 321 that moisture has been detected, transmits a command (e.g. wirelessly) to the control panel 201 to causing the shutting off of the water valve.

In some embodiments, the peripheral unit 303 of FIG. 3C may also include a probe interface 284 for connecting to a probe 106, where the probe 106 can be placed under another water-consuming apparatus or source of water.

As such, the peripheral unit 303, connected to the probe 106, can detect the presence of moisture under either of the water-consuming apparatuses and/or sources of water.

As shown in FIG. 3C, the humidity sensor 321 may be a set of metal, conductive tabs that form a circuit when water is present (the tabs connected by the presence of water).

The controller of the peripheral unit 303 may also process data collected by the humidity sensor 321 and produce data/commands to be transmitted by the I/O interface 312. For example, the controller may process data collected by the humidity sensor 321 or another sensor, 106 for instance. Processing the data may comprise preparing the data to be sent to the control panel 201. For example, the controller may package collected data about a moisture level in a format readable by the I/O interface 212 of the control panel 201. The data may be transmitted to the control panel 201 via the wired or wireless connection established between the peripheral unit 303 and the control panel 201. The probe controller may include logic components that perform the processing described above and memory components that store code for running operations of the probe controller and/or received or produced data. These components may be any type of logic and memory known in the art.

In some examples, the base of the peripheral unit 303 may be flat such that the peripheral unit 303 may be placed, e.g., flat or standing on the floor next to. e.g., an appliance. The humidity sensor 321 may be located on the flat base of the peripheral unit 303. As such, when water seeps onto the floor, as a result of, e.g., a leak from a fridge, the humidity sensor 321 may detect the presence of water, the controller of the peripheral unit 303 sending a transmission to the control panel 201 for causing the closing of the water valve 102.

The peripheral unit 303 with the humidity sensor 321 may also have an input interface 314 for, e.g., sending an override command to the control panel 201 to shut off the valve 102.

Figure 3E:
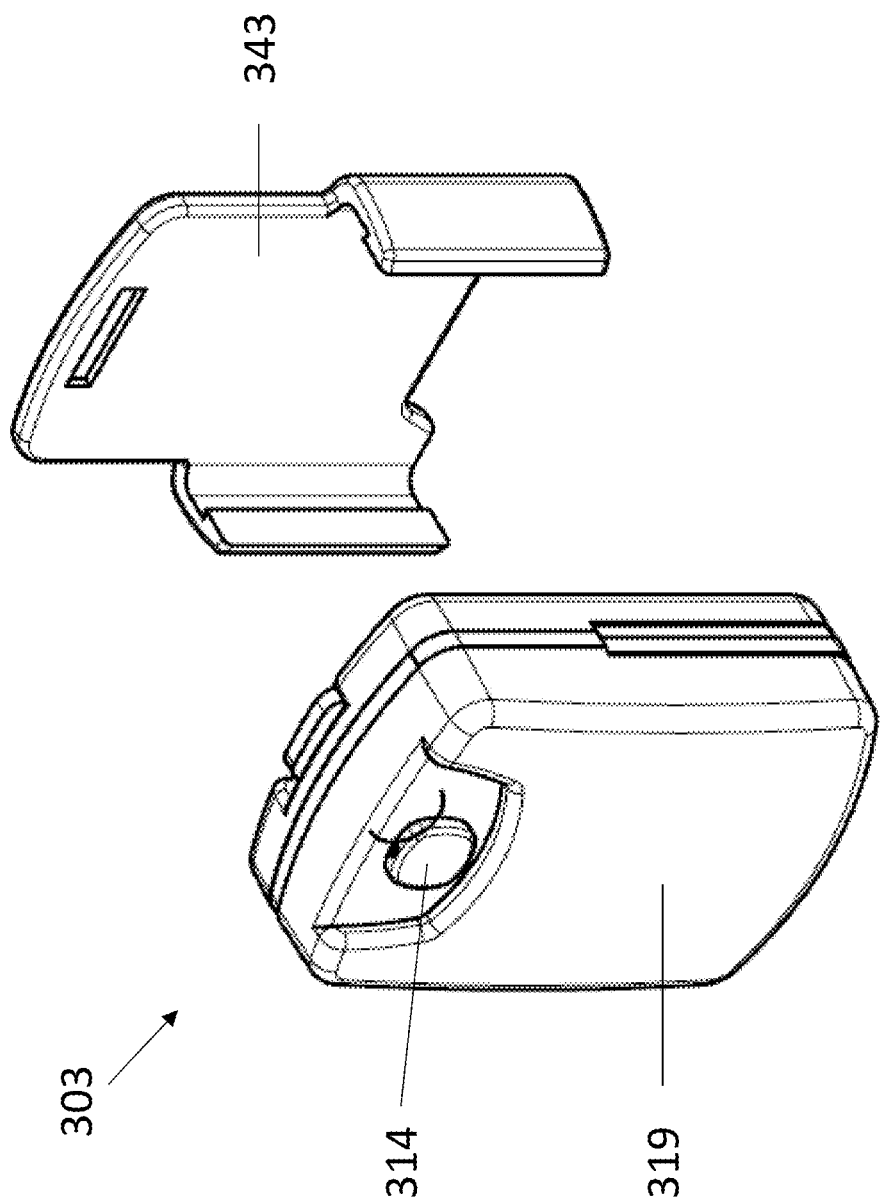
FIG. 3E is a drawing of a side perspective view of an exemplary peripheral unit for connecting to a vertical surface to detect the presence of water.

With reference to FIG. 3E, in some embodiments, the peripheral unit 303 with humidity sensor 321 may include a mounting for fastening to a surface, e.g. a vertical surface of, e.g., a sink, a bath, etc. As such, as the water in the sink or bath rises, the moisture sensor 321 detects the presence of water, and the controller, following the detection of moisture or water, transmits a wireless transmission to the control panel 201 of the peripheral unit 303 for causing the closing of the water valve 102. Exemplary fasteners include, but are not limited to, a suction cup, an adhesive, a magnet, a string attached at one end to the back of the housing 319 and at the other end to a hook for hooking onto the edge of the sink or bath, etc.

As shown in FIG. 3E, the peripheral unit 303 may also include a bracket 343 with side walls with grooves for receiving the rest of the peripheral unit 303 and for holding the rest of the peripheral unit 303 in a snug fit. The back of the bracket 343 may include the fastener for fastening to a surface, such as a vertical surface. Exemplary fasteners include, but are not limited to, a suction cup, an adhesive, a magnet, a string attached at one end to the back of the housing 343, etc.

As such, the peripheral unit 303 of FIG. 4B may be disposed in an area in which the presence of moisture is of interest. For example, if the peripheral unit 303 is part of a water regulation system 100 in a single-family home, the peripheral unit 303 may be disposed in a sink or a bathtub, such that the moisture sensor 321 may be submerged if the water in the sink or the bathtub rises above a certain level. A peripheral unit 303 may also be disposed outside of a sink, bathtub, washing machine, or other appliance which may be filled with water and where space is restricted. In such a configuration, the moisture sensor 321 may become wet if the appliance overflows.

Figure 4:
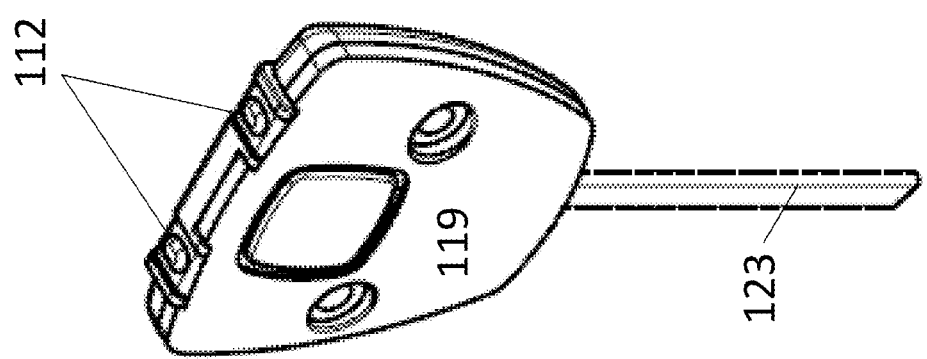
FIG. 4 is a drawing of a side perspective view of an exemplary moisture probe for connecting to an exemplary peripheral unit or control panel of an exemplary water regulation system.

Exemplary Probe:

Reference is now made to FIG. 4, illustrating an exemplary probe 106 for connecting to a peripheral unit 303, or a control panel 201 of the water regulation system 100.

The probe includes wiring 123 ending with a connector (e.g. a male connector) for connecting to a probe interface 284 (e.g. port) of the control panel 201 or the probe interface 384 of a peripheral unit 303.

The probe 106 does not have to be powered, instead, it may include a humidity sensor 112 for detecting the presence of moisture (e.g. water). The humidity sensor 112 may be a set of tabs made from a conductive material that form a circuit when water is present, sending a signal to the peripheral unit 303 or control panel 201 when moisture is detected via the wiring 123.

The housing 119 of the probe 106 may be thin, such that the probe 106 can be slid under a water-consuming apparatus, or a water source (e.g. a sink).

Communication Between Modules of the Water Regulation System:

In some examples, when the communication between the modules is wireless, the wireless communication established between the components of the system 100 may be a short-range wireless communication, such as Bluetooth. In other examples, the communication may be by radio frequency. In other examples, the communication may be over WiFi or a local area network.

One skilled in the art will recognize that a water regulation system 100 could be implemented using wired connections instead of or in conjunction with the wireless communication system 104. Further, one skilled in the art will readily understand how to implement wired connections between the components of the water regulation system 100 described above. Such a modification falls within the scope of the present disclosure.

Additional Peripheral Valves:

As discussed above, a water regulation system 100 may optionally include one or more peripheral valves 105. FIG. 1B illustrates three peripheral valves 105. Each peripheral valve 105 may control the flow of water to a particular region of the building 150 (e.g. a unit of a condominium, a floor of a building, an office space, etc.) Accordingly, each peripheral valve 105 may be disposed in a secondary pipe 172 of the water circulation system 170 that carries water to a particular region. For example, as shown in FIG. 1B, the building 150 may be a single-family home, and the water circulation system 170 may include two secondary pipes 172 which carry water to a bathroom and a utility room. Each of the peripheral valves 105 may be disposed in one of the secondary pipes 172, such that opening/closing each peripheral valve 105 may allow/shut off the flow of water into the bathroom, or the utility room. The peripheral valves 105 may be any type of valve known in the art, such as a gate valve or a ball valve. The peripheral valves 105 may be configured to simply allow or disallow the flow of water into the building 150 or may also be configured to control a rate of flow of water into the building 150.

Figure 5:
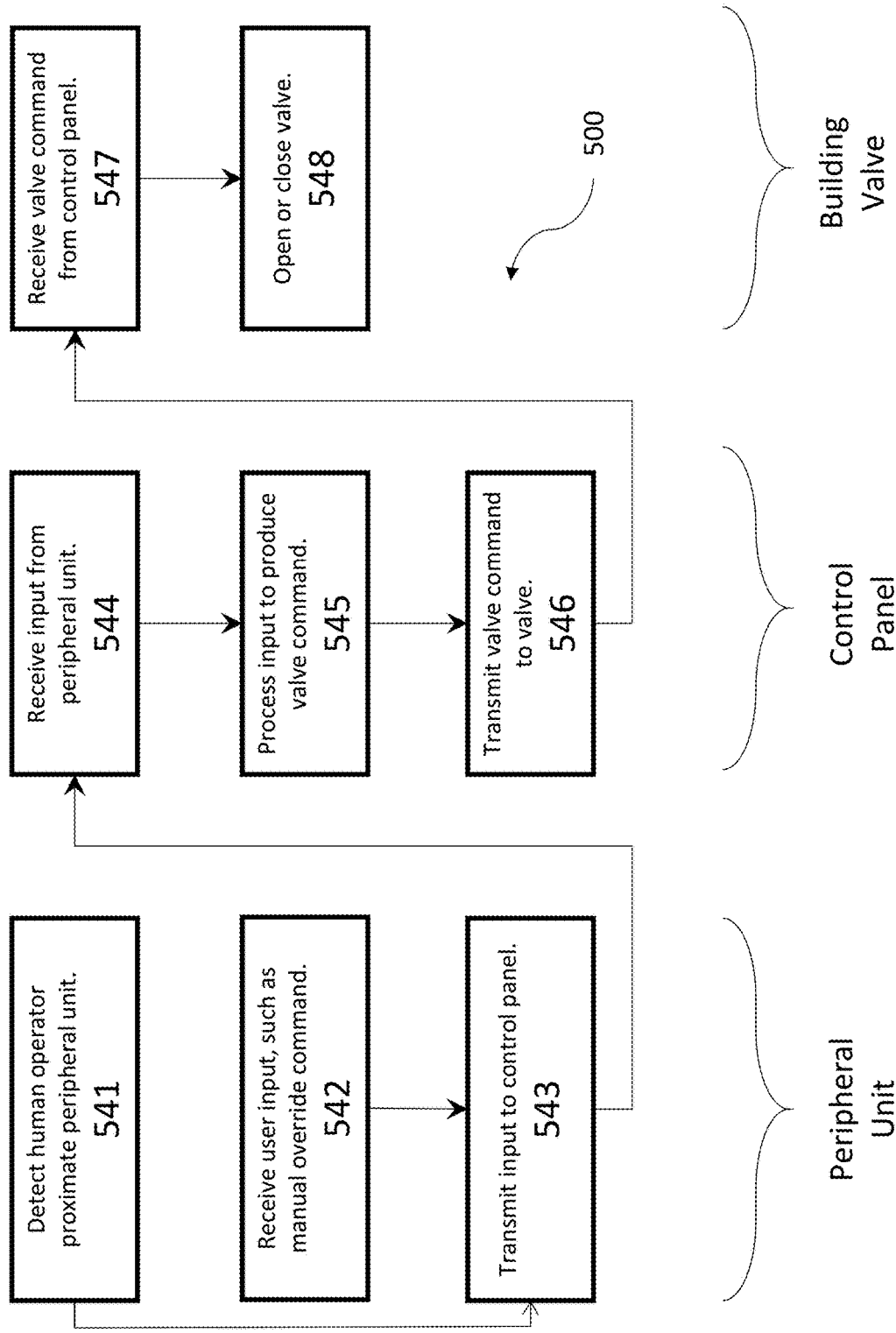
FIG. 5 is a flowchart of an exemplary method for opening or closing a water valve by using an exemplary water regulation system.
Figure 6:
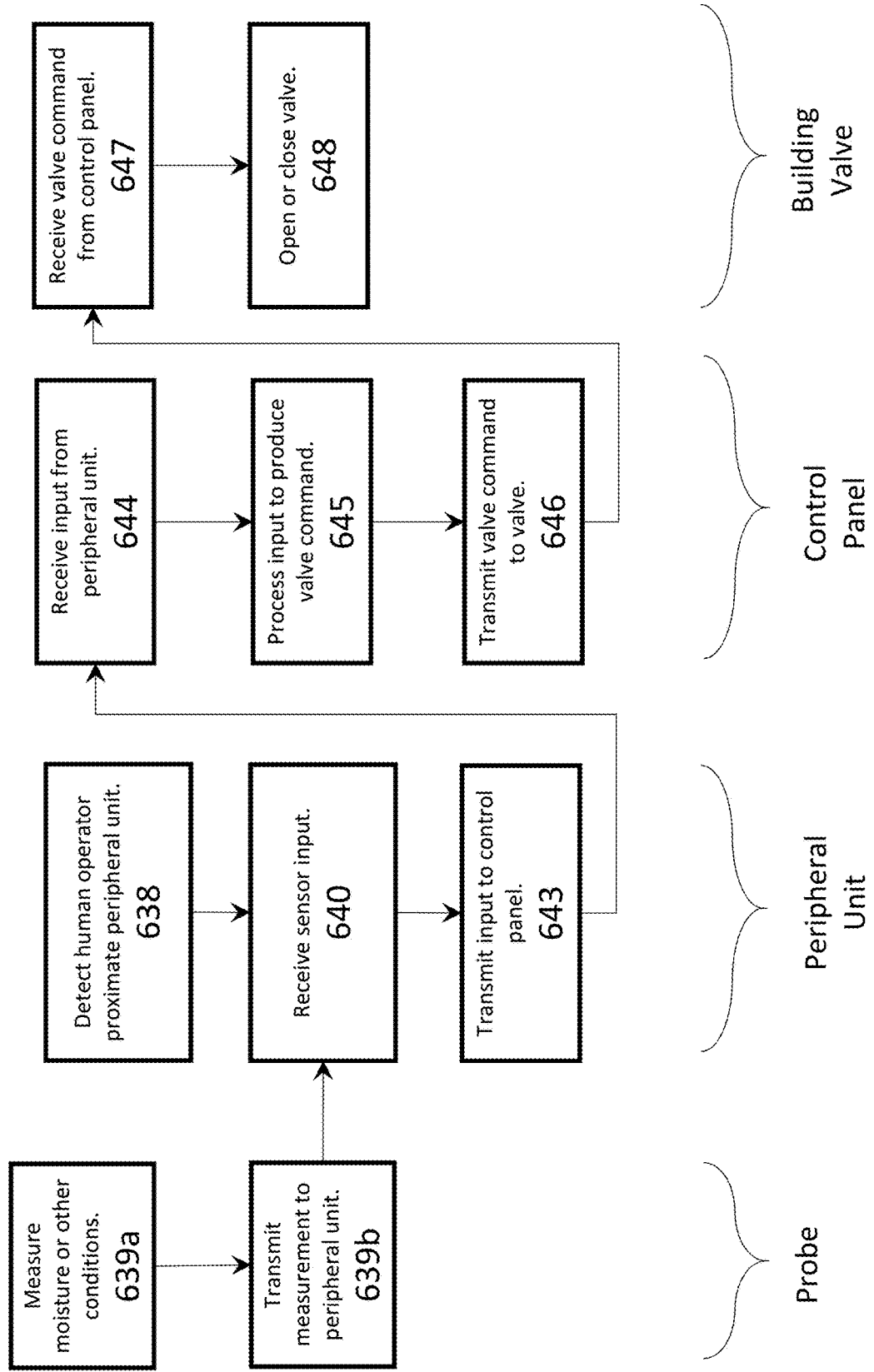
FIG. 6 is a flowchart of an exemplary method for opening or closing a water valve by using an exemplary water regulation system including an exemplary moisture probe.

Exemplary Method for Regulating Water in a Building:

In a second aspect, the present disclosure relates to methods for water regulation. The methods described below may use the water regulation systems described above or any other type of hardware and software known in the art. Methods according to the present disclosure include methods of turning on a flow of water into a building and methods of shutting off a flow of water into a building. FIGS. 5 and 6 outline such methods.

FIG. 5 outlines a method 500 of controlling a flow of water into a building based on user input. The following description refers to FIGS. 1-5 to describe the method in detail and to demonstrate how a water regulation system may be used to implement it. The method outlined in FIG. 5 may be performed by a water regulation system 100 including a peripheral unit 303, a communication module 104, a control panel 201, and a building valve 102. However, it will be understood that any other water regulation system in accordance with the present teachings may be used to perform the method 500.

In step 541, a peripheral unit 303 may detect the presence of a human operator. The detection may be performed by a motion detector 316 as described above.

In step 542, the peripheral unit 303 may receive user input. The human operator may provide user input through a user input interface 314, which may comprise a button, keypad, voice recognition system, or other combination of hardware and software. In some embodiments, the user input interface 314 may be a manual override and the peripheral unit 303 may receive a manual override instruction from the human operator. This user input may be performed when, for instance, the user detects a leak and would like to rapidly close water entering the building. In other examples, the user may be exiting the building for a prolonged period, and as such would like to prevent water circulating in the building during its absence.

Following step 541 or step 542, at step 543, the peripheral unit 303 may transmit a transmission to the control panel 201 for causing the opening/closing of the water valve 102. The transmission may be sent via a I/O interface 312 of the peripheral unit 303 over the wireless connection established with the I/O interface 212 of the control panel 201. In some embodiments, the transmission may be performed over a Bluetooth connection, or via one or more radio frequency signals. In some embodiments, the peripheral unit 303 may process/package the user input before transmitting it to the control panel 201.

In some examples, where the system 100 includes a peripheral unit 303 with a humidity sensor 321, detection of moisture by the humidity sensor 321 may cause the peripheral unit 303 to send a transmission to the control panel 201 for causing the closing of the valve 102. The detection of moisture could be a sign of a leak or, e.g., the overflowing of a bathtub or of a sink.

In step 544, the control panel 201 may receive the input from the peripheral unit 303. In some embodiments, the I/O interface 212 may receive the input and transfer the input to a main controller of the control panel 201.

In step 545, the control panel 201 may process the received input and produce a valve command for shutting the valve 102. The main controller 211 may analyze the input and determine whether the flow of water to the building should be allowed or shut off. If the flow of water should be allowed, the main controller 211 may produce a command to open the building valve 102. If the flow of water should be shut off, the main controller 211 may produce a command to close the building valve 102. In the present example where the received transmission is a manual override instruction, the main controller 211 may determine that the manual override instruction indicates that the flow of water should be shut off and produce a valve command to actuate the closing of the building valve 102.

In step 546, the control panel 201 may transmit the valve command to the building valve 102. The transmission may be performed by a I/O interface 212 of the control panel 201 wirelessly. In some embodiments, the transmission may be performed over a wired connection.

In step 547, the building valve 102 may receive the valve command from the control panel 201. In some embodiments, a I/O interface (not illustrated) of the building valve 102 may receive the input and transfer it to a valve controller (not illustrated). As discussed above, the valve command may be a command to either open the building valve 102 or close the building valve 102.

In step 548, the building valve 102 may either open or close in response to the valve command. In an exemplary embodiment, the valve command may be a command to close the building valve 102 produced in response to a manual override instruction. In such an embodiment, the building valve 102 will close, stopping the flow of water into the building.

It should be recognized that steps 542-548 can be performed rapidly by a water regulation system 100. Accordingly, the flow of water into a building can be rapidly stopped or started by a user using the water regulation system 100. This may prevent water leaks from becoming dangerous or damaging by stopping them quickly. The steps may also be performed with minimal input from a human operator. For example, a human operator may only be required to press a manual override button or otherwise provide user input. Further, the human operator may be able to provide this input from the site of a water leak, without having to physically interact with the building valve, which may be at a different location.

Methods of controlling a flow of water into a building based on user input may include variations on the steps shown in FIG. 5 and may include additional steps not shown therein. One skilled in the art will readily understand how to implement these based on the description of the water regulation system 100 provided above.

In some embodiments, the user input may be provided to the control panel 201 instead of to a peripheral unit 303. As described above, the control panel 201 may include a manual override or other user input interface and is accordingly capable of receiving user input. In such embodiments, the user input would not be transmitted from the peripheral unit 303 to the control panel 201, but rather would originate at the control panel 201. The user input may be processed and the building valve 102 may be commanded in the same manner as described above.

In some embodiments, the method may open/close a peripheral valve 105 instead of or in addition to opening/closing the building valve 102. In step 545, the main controller 211 may determine which valve(s) 105, 102 should be commanded; in step 546, the command may be transmitted to the selected valve(s) 105, 102. Steps 547-548 may be carried out by the building valve 102 and/or the peripheral valves 105.

In some embodiments, the water regulation system 100 may display a status of the building valve 102 and/or peripheral valves 105 to a human operator. The display may comprise an indicator or other visual display on the peripheral units 303 and/or on the control panel 201. The status of the building valve 102 may be communicated from the building valve 102 to the control panel 201 and from the control panel 201 to the peripheral units 303 via the wireless communication system 104.

Once the water valve is closed as a result of a manual override input being received at one of the components of the system 100 (e.g. a peripheral unit 303), the system 100 may not cause the water valve 102 to reopen (including, when motion is detected by one of the peripheral units 303) until input has been received at one of the components of the system 100 for causing the reopening of the water valve 120. For instance, a user may enter a passcode at the input interface 214 of the control panel 201 for causing the reopening of the water valve 102, where a command is transmitted to the water valve 102 for actuating the reopening of the water valve 102. In other examples, the control panel 201 or a peripheral unit 303 may receive wirelessly input from a user using an external computing device for causing the reopening of the water valve 102. The user input sent via the external computing device, may be, e.g., the user's credentials, a password or a command associated with reopening the water valve 102. In other examples, the user input for reopening the water valve 102 may be received at the input interface 314 of the peripheral unit 303.

FIG. 6 outlines a method for controlling a flow of water into a building based on sensor input. The following description refers to FIGS. 1-4 and 6 to describe the method in detail and to demonstrate how a water regulation system, such as the exemplary water regulation system 100, may be used to implement it.

In the method of FIG. 6, either step 638 or steps 639a and 639b may be performed. In step 638, a peripheral unit 303 may detect the presence of a human operator. The detection may be performed by a motion detector 316 or 216 as described above. The detected presence may comprise a sensor input. In step 639a, a peripheral unit 303 or an attached probe 106 may measure moisture or another condition as described above. The measurement may comprise a sensor input. In step 639b, the probe 106 may transmit the measurement to the peripheral unit 303 or the control panel 201.

In step 640, the peripheral unit 303 or the control panel 201 may receive the sensor input.

When the input is received by the peripheral unit 303, steps 643-648 mirror steps 543-548 outlined in FIG. 5 and described above. The description provided above of the steps and potential variations and additions applies to steps 643-648. Where a user input is described above, the method handles a sensor input in the present method.

In a first exemplary embodiment, the sensor input may comprise detected motion proximate a peripheral unit. In step 645, the main controller 211 may produce a command to allow a flow of water into the building so that the human operator proximate the peripheral unit may use the water. In a second exemplary embodiment, the sensor input may comprise detection of a high level of moisture by a probe 106 in an area where moisture is not desired, which will result in the closing of the valve. The advantages described above for responding to user input through presently described methods also apply to responding to sensor input through presently described methods.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A water regulation system for regulating the water of a water circulation system of a building or of a portion of a building comprising:
   a water valve with an open and closed position for regulating the flow of water into the water circulation system of the building or of the portion of the building;
   a control panel comprising:
      a power source for providing power to said control panel;
      a user input interface;
      a communication interface;
      a controller that is configured to actuate the opening or closing of said water valve; and
   one or more peripheral units, wherein each peripheral unit of said one or more peripheral units comprises:
      a power source for providing power to said peripheral unit;
      a user input interface;
      a motion detector;
      a communication interface that is configured to establish a connection with said communication interface of said control panel; and
      a controller that is configured to:
         upon said motion detector detecting motion, send a first transmission to said control panel via said connection for causing said controller of said control panel to actuate opening of said water valve for a given period of time;
         upon said input interface receiving input from a user to close said water valve, send a second transmission to said control panel via said connection for causing said controller of said control panel to actuate closing of said water valve,
         after a user provides additional user input at said control panel for allowing said water valve to reopen after motion is detected in a room of the building or of the portion of the building, detect motion of a user in a room of the building or of the portion of the building using said motion detector and transmit a third transmission to said control panel for causing the reopening of said water valve, allowing water to flow into the water circulation system of the building or of the portion of the building for a given period.

2. The system as defined in claim 1, wherein said water valve does not reopen following said control panel actuating the closing of said water valve after receiving said second transmission until said additional user input is received at said control panel or said input interface of one of said one or more peripheral units to reopen said water valve.

3. The system as defined in claim 2, wherein said communication interface of said control panel is further configured to establish a further wireless connection with an external computing device, and wherein said additional user input that is received at said control panel includes input that is transmitted via said further wireless connection established between said communication interface of said control panel and said external computing device.

4. The system as defined in any claim 2, wherein said additional user input that is received at said control panel is a passcode that is entered at said input interface of said control panel.

5. The system as defined in claim 1, further comprising:
   one or more humidity-sensing peripheral units, wherein each of said one or more humidity-sensing peripheral units comprises:
   a humidity sensor configured to detect the presence of water;
   an interface for establishing an additional connection with said communication interface of said control panel; and
   a controller that is configured to transmit a third transmission to said control panel via said additional connection for causing said controller of said control panel to actuate closing of said water valve upon said humidity sensor detecting presence of said water.

6. The system as defined in claim 5, wherein at least one of said one or more humidity-sensing peripheral units comprises a fastener for attaching said humidity-sensing peripheral unit to a wall of a bath or a sink such that said humidity sensor detects if water in said bath or said sink reaches a designated level.

7. The system as defined in claim 1, wherein said connection is a wireless Bluetooth connection.

8. The system as defined in claim 1, wherein said control panel further comprises a series of visual indicators, wherein each visual indicator of said series of visual indicators corresponds to one of said one or more peripheral units, and wherein said series of visual indicators indicates if motion is detected by said one more peripheral units following reception of said first transmission by said communication interface of said control panel.

9. The system as defined in claim 1, wherein said control panel causes the actuation of said water valve by transmitting a wireless transmission to an actuator of said water valve that causes the opening or closing of said water valve.

10. The system as defined in claim 1, wherein said control panel causes the actuation of said water valve via a wired connection to an actuator of said water valve that causes the opening or closing of said water valve.

11. A peripheral unit for use in a water regulation system that controls the intake of water in a water circulation system of a building or of a portion of the building, said water regulation system comprising a main control panel that actuates the opening or closing of a water valve for regulating the flow of water into the water circulation system of the building or the portion of the building, comprising:
    a power source for providing power to said peripheral unit;
    a user input interface;
    a motion detector;
    a communication interface that is configured to establish a connection with a communication interface of said control panel; and
    a controller that is configured to:
        upon said motion detector detecting motion, send a first transmission to said control panel via said connection for causing said controller of said control panel to actuate opening of said water valve for a given period of time;
        upon said input interface receiving input from a user to close said water valve, send a second transmission to said control panel via said connection for causing said controller of said control panel to actuate closing of said water valve;
        after a user provides additional user input at said control panel for allowing said water valve to reopen after detecting motion in a room of the building or of the portion of the building, detect motion of a user in a room of the building or of the portion of the building using said motion detector and transmit a third transmission to said control panel for causing the reopening of said water valve, allowing water to flow into the water circulation system of the building or of the portion of the building for a given period.

12. The peripheral unit as defined in claim 11, wherein the user input interface is a button.

13. The peripheral unit as defined in claim 11, further comprising an indicator for signaling to a user that the water valve is open or closed.

14. A method of regulating water in a water circulation system of a building or of a portion of the building to rapidly shut off flow into the building or the portion of the building, comprising:
    detecting activity of a user in a room of a building;
    transmitting a first transmission to a control panel for causing the opening of a water valve, allowing water to flow into the water circulation system of the building or of the portion of the building for a given period;
    receiving user input associated with stopping the flow of water into the water circulation system of the building or of the portion of the building;
    transmitting a second transmission to said control panel for causing the closing of said water valve, stopping the flow of water into the water circulation system of the building or of the portion of the building;
    after a user provides user input at said control panel for allowing said water valve to reopen upon detecting motion in a room of the building or of the portion of the building, detecting motion of a user in a room of the building or of the portion of the building respectively; and
    transmitting a third transmission to a control panel for causing the reopening of said water valve, allowing water to flow into the water circulation system of the building or of the portion of the building for a given period.

15. The method as defined in claim 14, wherein said user input associated with stopping the flow of water is received by said user pressing an override button.

16. The method as defined in claim 14, wherein the detecting of activity is detecting turning on a light switch in the room or the building.

* * * * *